Oct. 24, 1967  J. F. SWIFT ET AL  3,348,579
SELF-ADJUSTING PULSATING FLUID PRESSURE DAMPING ACCUMULATOR
Filed March 26, 1965  8 Sheets—Sheet 4
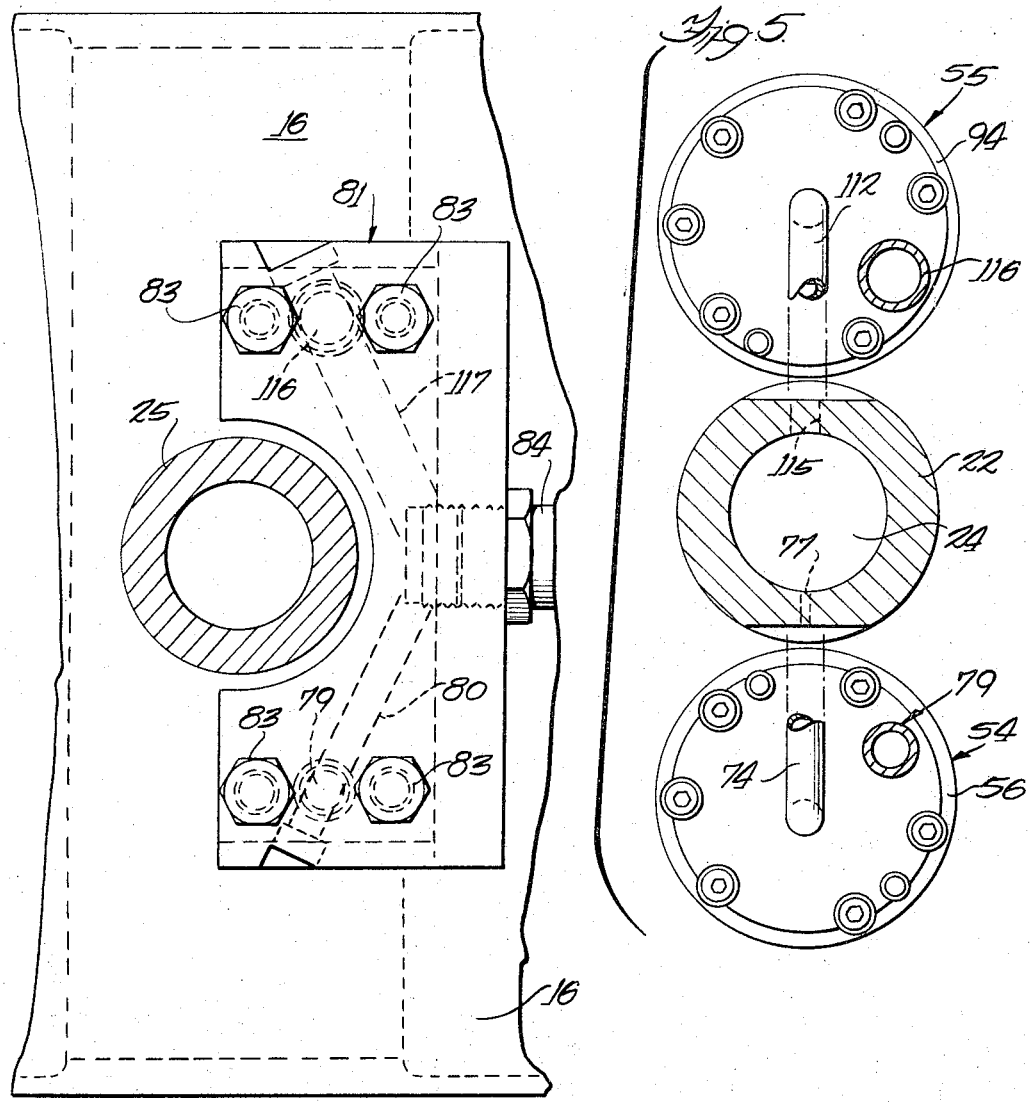
Inventors
John F. Swift
Ralph E. Wallace
Floyd B. Harman
Attorney

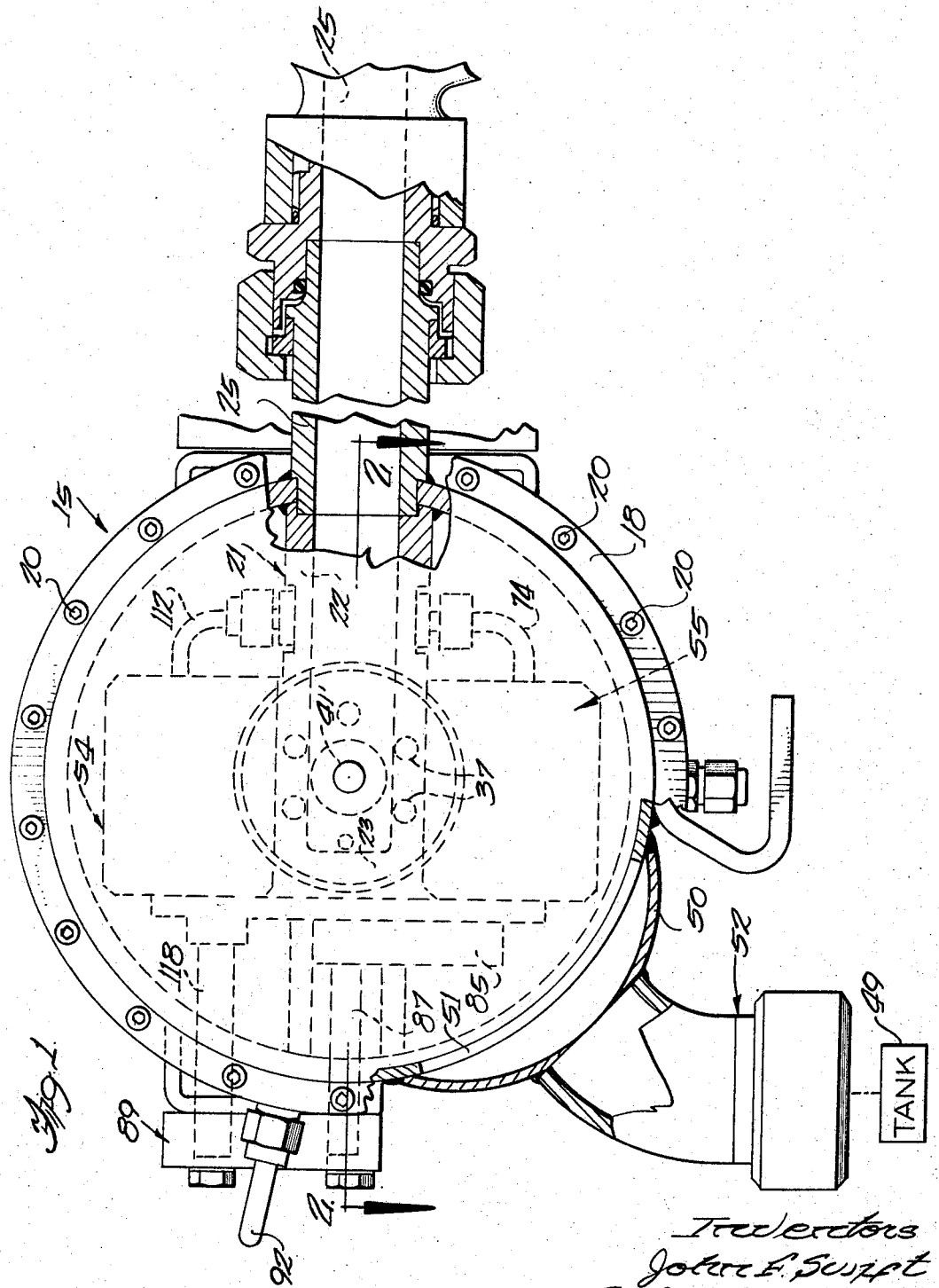

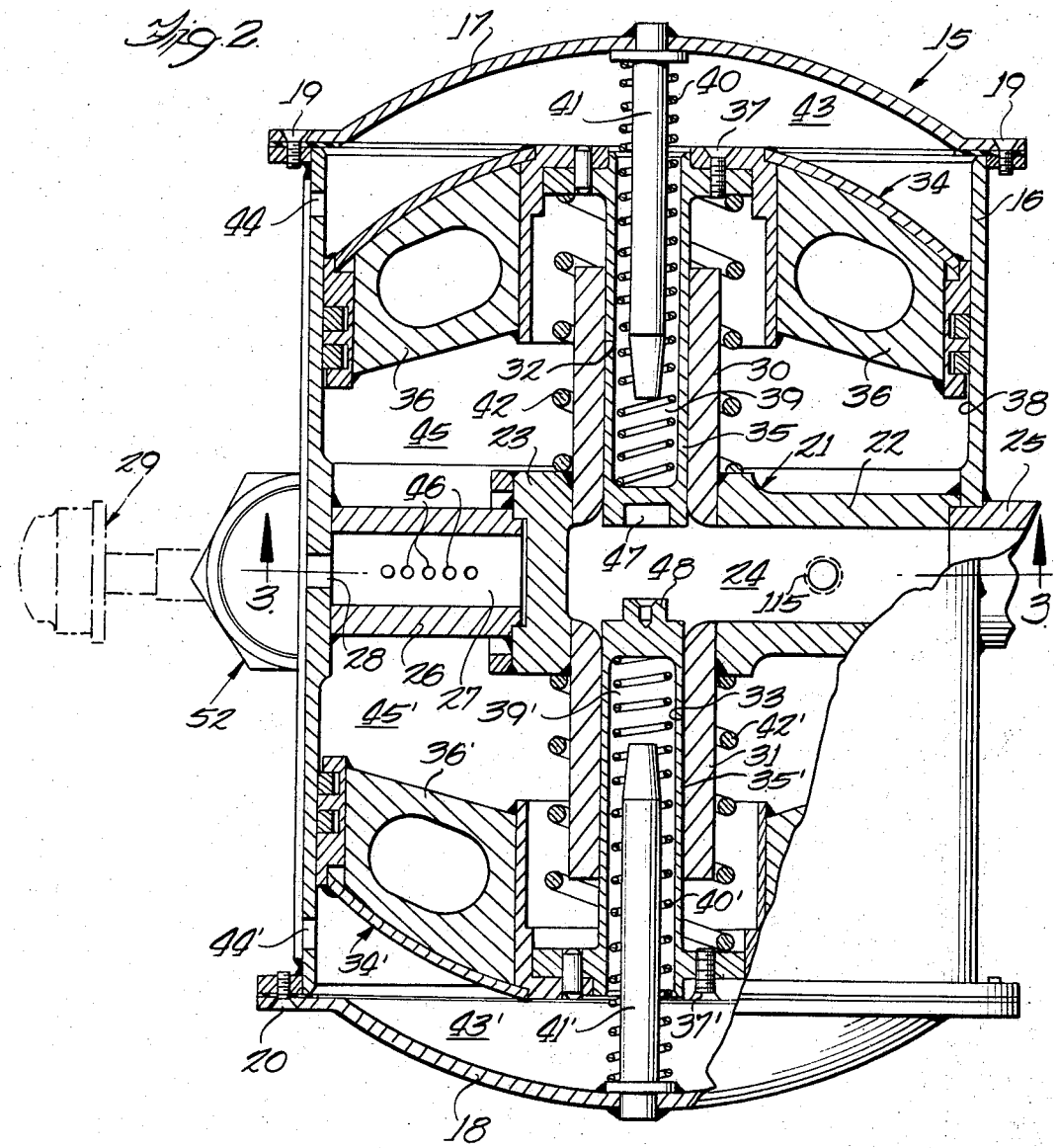

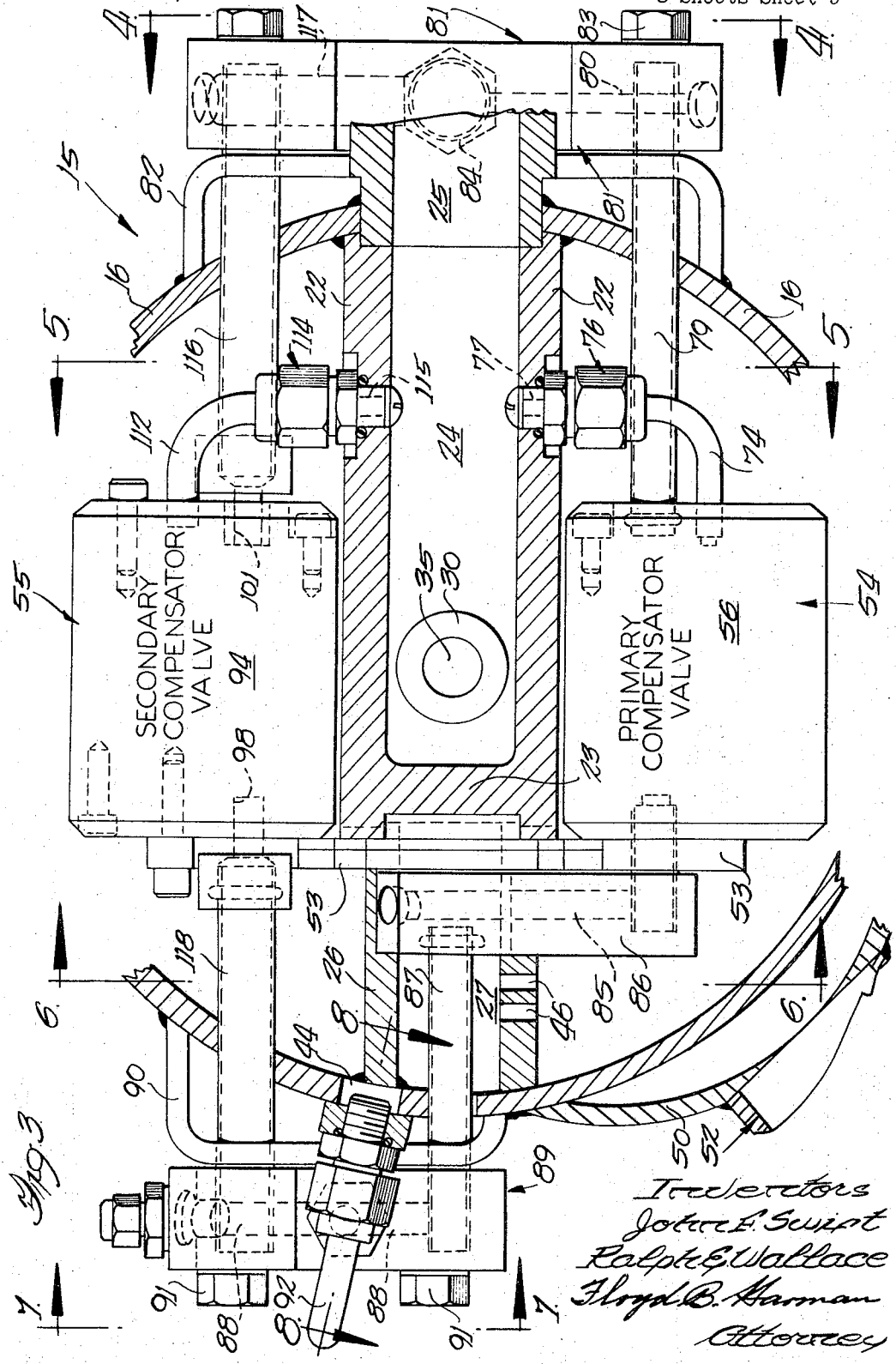

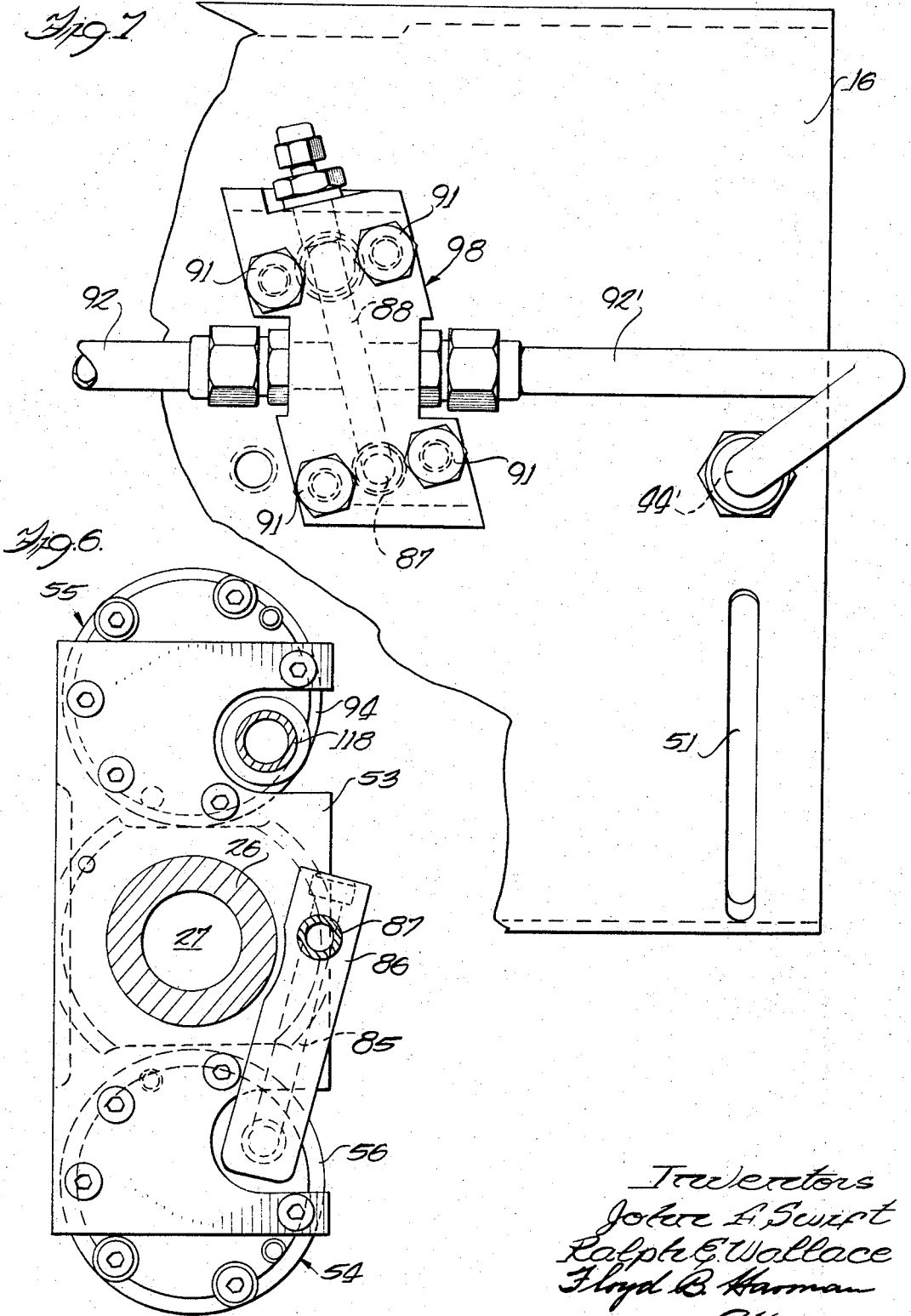

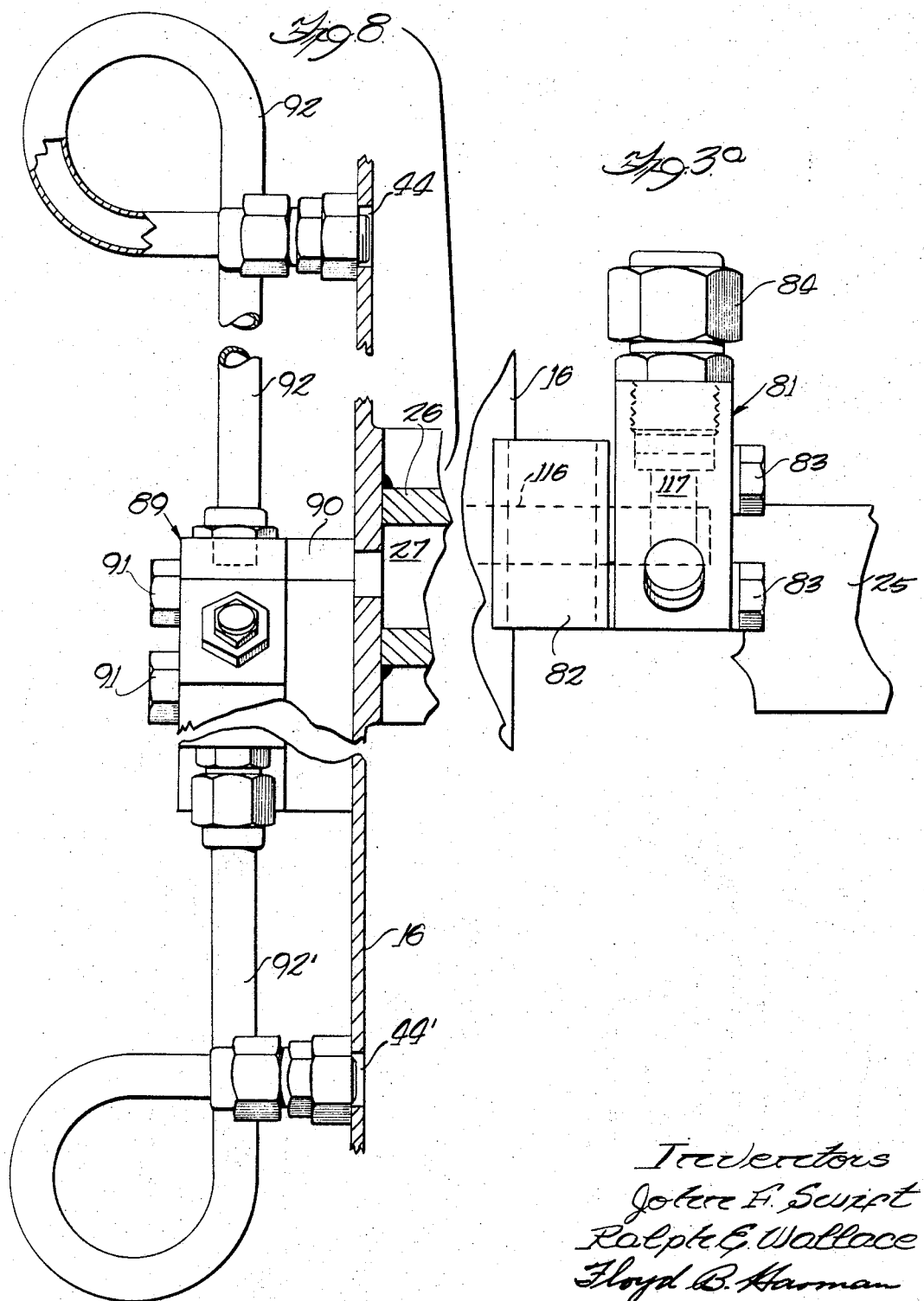

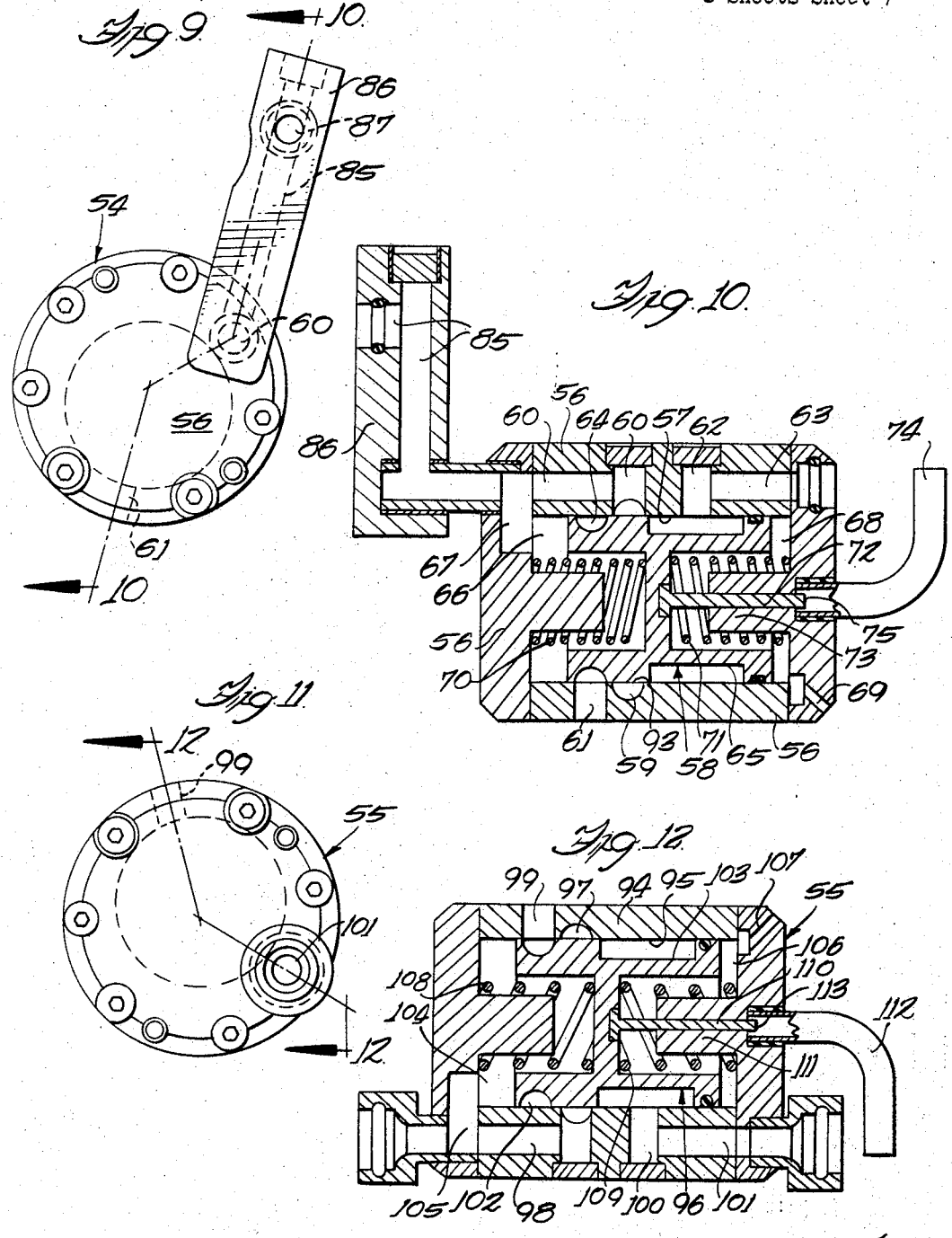

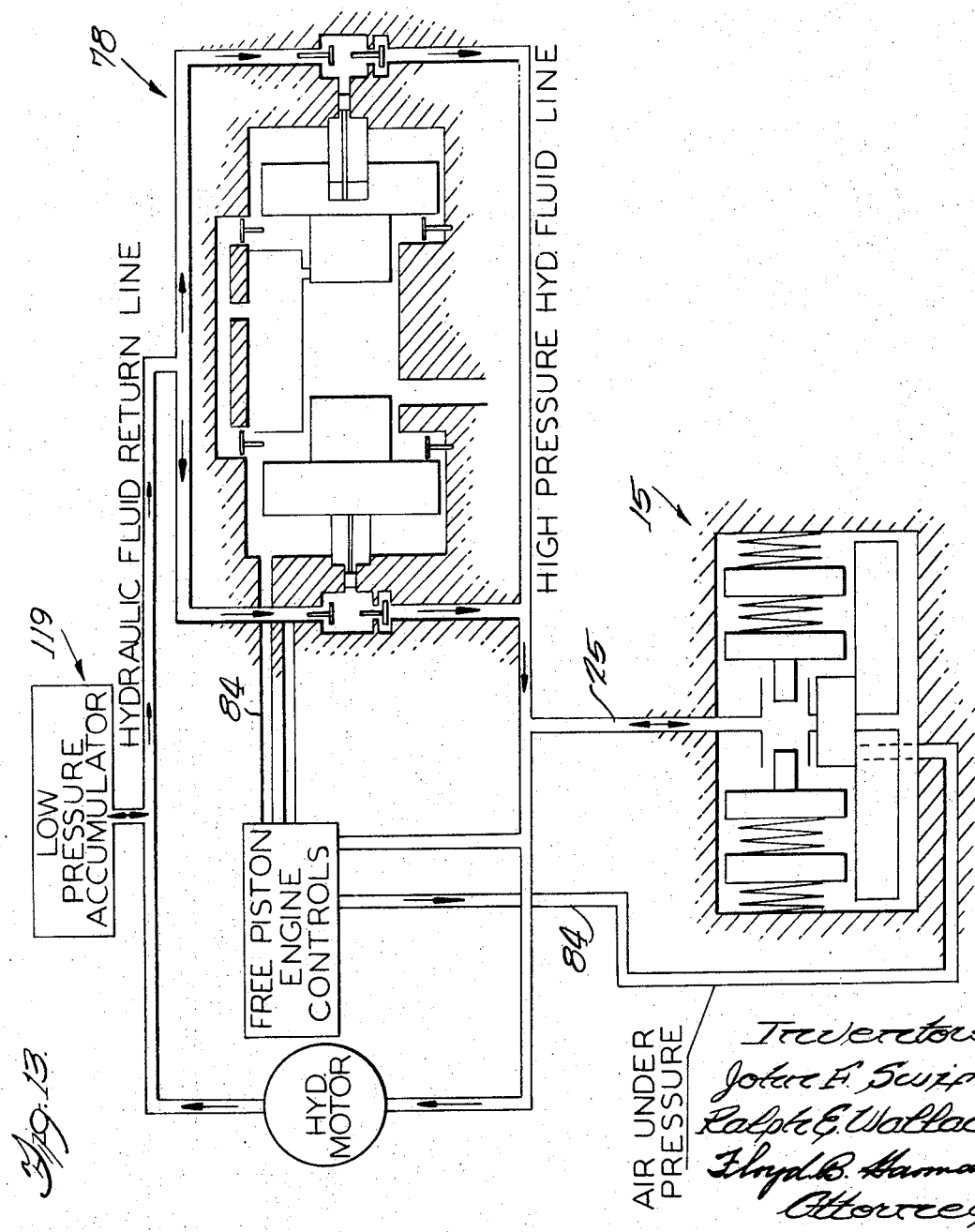

{ # United States Patent Office

3,348,579
Patented Oct. 24, 1967

3,348,579
SELF-ADJUSTING PULSATING FLUID PRESSURE DAMPING ACCUMULATOR
John F. Swift, Chicago, and Ralph E. Wallace, Elmhurst, Ill., assignors to International Harvester Company, Chicago, Ill., a corporation of Illinois
Filed Mar. 26, 1965, Ser. No. 443,037
13 Claims. (Cl. 138—31)

ABSTRACT OF THE DISCLOSURE

A compact size compound-piston type accumulator apparatus employing a source of air pressure for effectively damping rapid pressure pulsations occurring in a hydraulic fluid system whose mean pressure value may be variable over a wide range. A highly sensitive compensator valve system is positioned within the accumulator which senses changes in the mean pressure value (large and small) of the hydraulic system and rapidly adjusts compensatingly the effective value of the air pressure applied to the accumulator's piston means.

---

This invention relates to apparatus for eliminating or minimizing rapidly occurring pressure differentials in hydraulic pressure lines due to pressure pulsations emanating from some source such as the source of hydraulic pressure. More in particular this invention relates to a hydraulic accumulator capable of damping fluid pressure pulsations which automatically adjusts itself for varying changes in mean pressure level as dictated by variable operating conditions.

Certain types of hydraulic pumps produce cyclic pressure changes or pulsations. For example, a single cylinder hydraulic piston pump discharges the pumped fluid in cyclic intervals thus creating fluid pressure pulsations. Where the source of fluid under pressure is a free piston engine hydraulic pump such as that decsribed in United States Letters Patent No. 3,088,413, issued to A. E. W. Johnson, it will be appreciated by those skilled in the art that the frequency of pulsations is of a high order magnitude. Furthermore, the peak amplitude of pressure variations in such pulsations may not always be uniform for it must be remembered that the piston stroke of a free piston engine is variable.

When a source of undampened rapidly pulsating hydraulic fluid is used to energize hydraulic motors or other hydraulic equipment the overall efficiency is appreciably impaired for fluid losses increase. Furthermore, such pulsations appreciably increase the operational vibration and noise level.

Where the mean pressure value of a pulsating hydraulic line varies over a relatively small range, conventional bellows type or flexible bag type accumulators function satisfactorily. Large volume types of conventional accumulators can function over a wider range of mean pressure values but are not sufficiently sensitive enough to follow abrupt wide variations in such mean pressure values.

Vehicles, such as tractors, propelled hydraulically wherein a free piston engine hydraulic pump is employed as a source of fluid pressure may operate under variable flow and variable pressure conditions. Therefore it is readily apparent that if such vehicles are to operate efficiently under all normal operating conditions, some means in compact form must be provided which will dampen pressure pulsations at any mean pressure level which may be expected in operation. Further, such means must function satisfactorily during both minor and major changes in the mean pressure valve occurring in the hydraulic line.

Accordingly, it is a prime object of the present invention to provide a hydraulic accumulator which will effectively dampen fluid pressure pulsations in a hydraulic line.

Another equally important object of the present invention is to provide a hydraulic accumulator according to the preceding object which will sense changes in the mean pressure of the hydraulic line and responsive thereto automatically adjust itself to function under the changed mean pressure value in said hydraulic line.

A further object of the present invention is to provide a hydraulic accumulator according to the preceding objects which rapidly adjusts itself in response to both major and minor changes in the mean pressure level of the hydraulic line.

Still another object of the present invention is to provide a hydraulic accumulator according to the preceding objects which is in compact form adapted for use, such as in hydraulically propelled vehicles, where space requirements are critical.

Yet a further object of the invention is to provide a hydraulic accumulator according to the preceding objects which is low in cost.

These and other desirable and important objects inherent in the invention will be more readily understood from the ensuing description, the appended claims and the annexed drawings wherein:

FIGURE 1 is an end view of the accumulator of this invention, partly in section and partly broken away, showing the general arrangement of the components;

FIGURE 2 is a plan view, partly in section and partly broken away, taken on line 2—2 of FIGURE 1 illustrating details of the pistons of the accumulator of the present invention;

FIGURE 3 is an enlarged view, partly in section and partly broken away, taken on line 3—3 of FIGURE 2, showing the assembly of the accumulator of this invention more in detail;

FIGURE 3a is a view, partly broken away, showing a portion of the rightward end of the assembly of FIGURE 3 but rotated 90°;

FIGURE 4 is a view, partly in section and partly broken away, taken on line 4—4 of FIGURE 3, illustrating a pneumatic manifold in detail;

FIGURE 5 is a view, partly in section and partly broken away, taken on line 5—5 of FIGURE 3, showing the ends of both primary and secondary compensator valves and their physical location with respect to each other in the accumulator of this invention;

FIGURE 6 is a view, partly in section and partly broken away, taken on line 6—6 of FIGURE 3, showing the ends of both primary and secondary compensator valves opposite to that illustrated in FIGURE 5;

FIGURE 7 is a side view of the accumulator of this invention, partly broken away, taken on line 7—7 of FIGURE 3 showing another pneumatic manifold and connections thereto;

FIGURE 8 is a sectional view partly broken away taken on line 8—8 of FIGURE 3 illustrating further details of the view of FIGURE 7;

FIGURE 9 is the leftward end view of the primary compensator valve employed in the accumulator of this invention;

FIGURE 10 is a sectional view, partly broken away, taken on line 10—10 of FIGURE 9 showing the details of the primary compensator valve;

FIGURE 11 is the leftward end view of the secondary compensator valve employed in the accumulator of this invention;

FIGURE 12 is a sectional view, partly broken away, taken on line 12—12 of FIGURE 11 illustrating the details of the secondary compensator valve; and FIGURE 13 is a schematic view of a free piston engine hydraulic pump as a source of pulsating hydraulic pressure in a hydraulic working circuit wherein the accumulator of this invention is employed to dampen generated pressure pulsations.

With continued reference to the drawings the numeral 15 in FIGURES 1 and 2 indicated generally the self-adjusting pulsating fluid pressure damping accumulator of the present invention. The accumulator 15 includes a cylindrically shaped casing 16 having end-caps 17 and 18 secured thereto conventionally such as by a plurality of circumferentially disposed screws 19 and 20 shown in FIGURE 2.

Disposed within the casing 16 is a manifold, generally indicated at 21, integrally connected thereto such as by welding as best shown in FIGURE 2. The manifold 21 includes a tube member 22 with a wall 23 forming a hydraulic chamber 24. The chamber 24 is communicatively connected to the hydraulic line 25 the pulsations of which is being dampened by the accumulator 15. The other side of the wall 23 is rigidly connected to another tube member 26 forming a vent chamber 27 leading to the atmosphere through port 28 communicatively connected to a conventional air filter 29 illustrated in dotted lines in FIGURE 2.

Disposed longitudinally on the manifold 21, in rigid relation, is a pair of cylinders 30, 31 in coaxial relation as seen in FIGURE 2. The cylinders 30, 31 may be rigidly mounted on the manifold 21 by conventional means such as by welding. The cylinder 30 is provided with a longitudinal cylinder bore 32 and likewise the cylinder 31 is provided with a cylinder bore 33. The cylinder bores 32 and 33 are coaxial and of substantially equal diameter.

Positioned in the upper portion of the casing 16, as viewed in FIGURE 2, is a compound piston generally indicated at 34, comprising a hydraulic piston 35 disposed slidably within the cylinder bore 32 and rigidly connected to an elastic fluid piston such as an air piston 36 as by conventional screws, one of which is shown at 37. The air piston or bounce piston 36 is slidable along the inner wall 38 of the casing 16 as evident from FIGURE 2. Thus it will be apparent that the air piston 36 reciprocates axially with the hydraulic piston 35.

Referring to FIGURE 2 it will be seen that the hydraulic piston 35 is of a hollow construction which forms a spring chamber 39 for containing a compression spring 40. A guide pin 41 rigidly connected to the end-cap 17 extends into the spring chamber 39 to provide means for guiding the compression spring 40 as is evident from FIGURE 2. Thus the spring 40 urges the compound piston 34 in a downward direction as viewed in FIGURE 2.

Referring again to FIGURE 2 it will be seen that there is another compression spring 42, seated on the stationary manifold 21 which urges the compound piston 34 upwardly. Thus the springs 40 and 42 oppose each other and are balanced to urge the position of compound piston 34 in approximately the position shown in FIGURE 2. As will be apparent later the characteristics of the springs 40 and 42 should be chosen with care.

Again referring to FIGURE 2 it will be seen that there is provided an elastic fluid chamber such as a pneumatic compression chamber or bounce chamber 43 above the compound piston 34. In order to regulate the pneumatic pressure in the chamber 43 a port 44 is provided in the casing 16 which leads to an air pressure control means in the form of a pressure compensator valve later to be described. Below the air piston 36 is a chamber 45 which is vented to the atmosphere through apertures 46 in the tube member 26 communicating the chamber 45 with the vent chamber 27 which in turn communicates with the atmosphere as previously described.

From the foregoing, it will be apparent that while the opposed springs 40 and 42 urge the piston 34 toward the position illustrated in FIGURE 2 any superatmospheric air pressure introduced into chamber 43 urges the piston 34 downwardly against the upward urging of spring 42. Similarly, hydraulic pressure in the chamber 24 from the hydraulic line 25 urges the hydraulic piston 35 upwardly against the downward urging of the spring 40.

From the foregoing it will be apparent that if the mean pressure value of the hydraulic fluid in the line 25 increases, such pressure rise can be opposed by a correspondingly increased air pressure in the pneumatic chamber 43 thus maintaining the position of the piston 34 in approximately the position illustrated in FIGURE 2. However, rapid pressure pulsations in the line 25 causes the compound piston 34 to reciprocate in short or vibratory strokes. Thus it is desirable that the weight or mass of the compound piston 34 be of a minimum value so that it is capable of rapid movement substantially in resonance with pressure pulsations occurring in the hydraulic line 25.

Now it will be apparent that only one compound piston 34 is necessary to dampen effectively the pressure pulsations in the line 25. However in such case the accumulator 15 would be dynamically unbalanced resulting in vibration of the casing 16 and all stationary components. To neutralize the effect of such unbalance an opposing compound piston 34' equal in weight to that of compound piston 34 is provided. The component parts of compound piston 34' are identical to that of compound piston 34, except as noted below and accordingly such component parts bear the same numerical designations but primed. Thus it will be apparent that compound piston 34' always moves in the opposite direction to that of compound piston 34. It will be noted that hydraulic piston 35 is provided with a cylindrically shaped recess 47 positioned for reception of a cylindrically shaped projection 48 disposed in coaxial alignment on hydraulic piston 35'. Hydraulic fluid in the recess 47 becomes trapped by the projection 48 in the event that a sudden drop in hydraulic pressure occurs in the chamber 24 which in event of failure of the air pressure compensator valves permits air pressure in the pneumatic chambers 43 and 43' to drive compound pistons 34 and 34' toward each other. This arrangement prevents, during such occurrence, violent contact of the inner ends of hydraulic pistons 35 and 35' with each other thereby avoiding damage.

Now in order to keep the size of the accumulator 15 to a small magnitude necessarily restricts the combined volume of the pneumatic chambers 43, 43' to a low value. Thus a small movement of the pistons 34 and 34' due to an increase in pressure in the hydraulic line 25 appreciably increases the air pressure in the pneumatic chambers 43 and 43'. Now in order to reduce the pressure change in the chambers 43 and 43' due to movements of the compound pistons 34 and 34' a remote auxiliary tank 49 (FIGURE 1) communicatively connected to the chambers 43 and 43' may optically be provided. The volumetric capacity of the auxiliary tank 49 should be carefully chosen so that the accumulator 15 is tuned appropriately to meet the maximum hydraulic pressure changes during cyclic pulsations occurring in the hydraulic line 25. Means for communicating the auxiliary tank 49 with the pneumatic chambers 43 and 43' will now be described.

Mounted in sealed relation to the external surface of the casing 16 is a manifold 50 as shown in FIGURES 1 and 3. The manifold 50 communicates with pneumatic chamber 43' through a peripheral slot 51 as seen in FIGURE 1. FIGURE 7 illustrates the slot 51 in the casing 16 with the manifold 50 removed. A similar second slot in casing 16 (not shown) also communicates manifold 50 with pneumatic chamber 43 in like manner. The manifold 50 in turn communicates with the auxiliary tank 49 through conventional piping connections indicated generally by the numeral 52. It should be borne in mind that the communicating means between the chambers 43 and 43' above described should be relatively large so that flow of air between the chambers 43, 43′ and the auxiliary tank 49 when required is substantially unrestricted. Means will now be described for automatically regulating the pressure in pneumatic chambers 43 and 43′ according to the mean pressure value of the hydraulic fluid in the hydraulic line 25.

Referring to FIGURE 3 it will be seen that a transverse extending bracket 53 is rigidly secured to the wall 23 of the tube member 22. Secured rigidly in a conventional manner to one end portion of the bracket 53 is a primary compensator valve indicated generally at 54. Similarly a secondary compensator valve, indicated generally at 55, is secured rigidly in a conventional manner to the other end portion of the bracket 53.

Referring now to FIGURES 9 and 10 it will be seen that the primary compensator valve 54 includes a stationary housing 56 having an axial bore 57 adapted to support slidably therein a valve plunger indicated at 58 as shown. The housing 56 is provided with an annular groove 59 in communication with regulated pressure discharge air passage 60. In addition the housing 56 is provided with port 61 which exhausts or vents into the atmosphere through chambers 45, 45′. Also the housing 56 has a further port 62 communicating with passage 63 as indicated. The valve plunger 58 includes a peripheral groove 64 registerable with annular groove 59 and port 61. In addition the valve plunger 58 is provided with a circumferential groove 65 registerable with annular groove 59 and in continuous registration with port 62 as shown.

The valve 54 is provided with an air chamber 66 communicatively connected to the regulated pressure discharge air passage 60 through the bore 67. From this it will be apparent that air under pressure in the air chamber 66 urges the valve plunger 58 rightwardly as viewed in FIGURE 10.

The rightward end portion of the valve plunger 58 is provided with another air chamber 68 which is vented to the atmosphere through port 69 and chambers 45, 45′. Opposed compression springs 70 and 71 are disposed respectively in air chambers 66 and 68 which urge the valve plunger 58 toward the position illustrated in FIGURE 10.

The valve plunger 58 includes a hydraulic piston 72 protruding slidably through an axial bore disposed in an inwardly extending boss 73 of the housing 56 as shown in FIGURE 10. Connected to the rightward end portion of the housing 56 is a hydraulic conduit 74 such that hydraulic pressure in the conduit 74 acts on the end 75 of hydraulic piston 72 to urge the valve plunger 58 leftwardly as viewed in FIGURE 10.

The hydraulic conduit 74 communicates with the chamber 24 and hydraulic line 25 through the wall of the tube member 22 as best shown in FIGURE 3. The connection of the hydraulic conduit 74 to the tube member 22 may be a conventional tube connector indicated at 76 having a fluid flow restriction in the form of an orifice shown in dotted lines at 77. The purpose of the orifice 77 is to minimize or dampen the effect of rapid pressure pulsations of the chamber 24 in the conduit 74. Thus the hydraulic pressure in the conduit 74 will be dampened as to rapid pulsations but yet equal the mean or average hydraulic pressure in the chamber 24 and hydraulic line 25.

The passage 63 of the valve 54 in FIGURE 10 is communicatively connected to a source of air under pressure. The source of air pressure is immaterial insofar as the present invention is concerned. For example the source of air under pressure may conveniently be taken from the air compressor of a free piston engine hydraulic pump indicated generally at 78 in FIGURE 13.

Referring to FIGURE 3 the air passage 63 is communicatively connected to conduit 79 leading through the casing 16 which in turn is communicatively connected to air passage 80 disposed in the manifold block, indicated generally at 81 in FIGURE 4, attached to the casing 16 by bracket 82 (FIGURE 3) and bolts 83. The air passage 80 in manifold block 81 is communicatively connected to conduit 84 which in turn leads to a source of air under pressure as is evident from FIGURES 3, 4 and 13.

Referring back to FIGURE 10 the regulated pressure discharge air passage 60 is communicatively connected to air passage 85 in the block 86. The air passage 85 in the block 86 in turn communicates with conduit 87 leading through the casing 16 as is evident from FIGURE 3. The conduit 87 communicatively connects to air passage 88 in manifold block indicated generally at 89 in FIGURES 3 and 8. The manifold block 89 is mounted on casing 16 through bracket 90 and bolts 91 as best seen in FIGURE 8. The air passage 88 in the manifold block 89 is communicatively connected to conduits 92 and 92′. The conduit 92 is connected to pneumatic compression chamber 43 (FIGURE 2) through port 44. Likewise the conduit 92′ is connected to pneumatic compression chamber 43′ through the port 44′.

From the foregoing it will be apparent that the air pressure in the regulated pressure discharge air passage 60 of the primary compensator valve 54 (FIGURE 10) is equal in value to the air pressure in both penumatic compression chambers 43, 43′ (FIGURE 2). The operation of the primary compensator valve 54 will now be described.

In FIGURE 3 the mean hydraulic pressure value of the pulsating fluid pressure in the chamber 24 as delivered from the hydraulic line 25 is communicated to the hydraulic conduit 74 leading into the primary compensator valve 54. The restrictive orifice 77 between the chamber 24 and hydraulic conduit 74 dampens appreciably the pulsations of the fluid in the hydraulic conduit 74.

Referring now to FIGURE 10 the mean hydraulic pressure in hydraulic conduit 74 acts upon the end 75 of hydraulic piston 72 in the primary compensator valve 54 thus moving the valve plunger 58 leftwardly. This movement of the valve plunger 58 causes the circumferential groove 65 to register with the annular groove 59 thus communicating the source of air under pressure connected to passage 63 with the regulated pressure discharge air passage 60. Since as previously described, the regulated pressure discharge air passage 60 is communicatively connected to the pneumatic compression chambers 43, 43′ (FIGURE 2) this movement of the valve plunger 58 results in elevating the value of air pressure in the pneumatic compression chambers 43, 43′. Correspondingly the value of the pressure in the air passage 60 (FIGURE 10) increases the pressure in the air chamber 66 of the primary compensator valve 54. Increased pressure in the air chamber 66 urges movement of the valve plunger 58 rightwardly until the land 93 registers with the annular groove 59 as shown in FIGURE 10 thus terminating further increase in pressure in passage 60.

Now suppose the means pressure value of hydraulic fluid in the chamber 24 decreases due to a drop in the line pressure in the hydraulic line 25 the hydraulic pressure in the conduit 74 correspondingly decreases. This permits the existing air pressure in the air chamber 66 of the primary compensator valve 54 to move the valve plunger 58 rigthwardly beyond the position shown in FIGURE 10 until the peripheral groove 64 establishes communication between the annular groove 59 and the exhaust port 61. Compressed air in the pneumatic compression chambers 43, 43′ thus is permitted to exhaust through the port 61 until the air pressure value in the air chamber 66 is reduced sufficiently so that the hydraulic pressure in conducit 74 acting on hydraulic piston 72 moves the valve plunger 58 leftwardly to the position shown in FIGURE 10.

At this point it will be apparent that the characteristics of the springs 70 and 71 should be light or low so that the valve plunger 58 is movable in response to minor changes in the mean pressure value of hydraulic fluid in the hydraulic line 25.

Now it has been shown that the primary compensator valve 54 is sensitive to minor variations in the value of the mean hydraulic pressure in the hydraulic line 25. However in the event of a sudden or abrupt major change in the mean pressure value in the line 25 the primary compensator valve 54 may not function with sufficient rapidity to effect the necessary corresponding air pressure change in the pneumatic compression chambers 43, 43'. In such event the compound pistons 34, 34' would move to their respective stroke limiting position and thus cease to resonate with the pulsations in the hydraulic line 25 until the air pressure in the pneumatic compression chambers 43, 43' approaches the proper pressure value corresponding to the mean pressure value in the hydraulic line 25. In order to effect a rapid compensation of air pressure value in the pneumatic compression chambers 43, 43' in response to a sudden major change in the mean pressure value of the hydraulic line 25 the secondary compensator valve 55 functions combinedly with the primary compensator valve 54. The secondary compensator valve 55 will now be described.

Referring now to FIGURES 11 and 12 it will be seen that the secondary compensator compensator valve 55 includes a stationary housing 94 having an axial bore 95 adapted to support slidably therein a valve plunger indicated at 96 as shown. The housing 94 is provided with an annular groove 97 in communication with another regulated pressure discharge air passage 98. In addition the housing 94 is provided with port 99 which exhausts or vents into the atmosphere through chambers 45, 45'. Also the housing 94 has a further port 100 communicating with passage 101 as indicated. The valve plunger 96 includes a peripheral groove 102 registerable with annular groove 97 and port 99. In addition the valve plunger 96 is provided with a circumferential groove 103 registerable with annular groove 97 and in continuous registration with port 100 as shown.

The valve 55 is provided with an air chamber 104 communicatively connected to the regulated pressure discharge air passage 98 through the bore 105. From this it will be apparent that air under pressure in the air chamber 104 urges the valve plunger 96 rightwardly as viewed in FIGURE 12.

The rightward end portion of the valve plunger 96 is provided with another air chamber 106 which is vented to the atmosphere through port 107 and chambers 45, 45' previously described. Opposed compression springs 108 and 109 are disposed respectively in the chambers 104 and 106 which urge the valve plunger 96 toward the position illustrated in FIGURE 12.

At this point it should be mentioned that the physical characteristics of the springs 108 and 109 are preferably but not necessarily stronger than the springs 70 and 71 of the primary compensator valve 54 for reasons which will become more apparent later herein.

The valve plunger 96 includes a hydraulic piston 110 protruding slidably through an axial bore disposed in an inwardly extending boss 111 of the housing 94 as shown in FIGURE 12. Connected to the rightward end portion of the housing 94 is a hydraulic conduit 112 such that the hydraulic pressure in the conduit 112 acts on the end 113 of piston 110 to urge the valve plunger 96 leftwardly as viewed in FIGURE 12.

The hydraulic conduit 112 communicates with the chamber 24 and hydraulic line 25 through a suitable aperture in the wall of the tube member 22 as best shown in FIGURE 3. The connection of the hydraulic conduit 112 to the tube member 22 may be a conventional tube connector indicated at 114 having a fluid flow restriction in the form of an orifice shown in dotted lines at 115. The purpose of the orifice 115 is to reduce the effect of rapid pressure pulsations in the chamber 24. However it will be noted that the orifice 115 for the secondary compensator valve 55 is much larger than the orifice 77 for the primary compensator valve 54. The reason that the orifice 115 is larger than the orifice 77 is that the secondary compensator valve 55 actuates only upon the occurrence of a sudden major change in the mean pressure value in the hydraulic line 25. The large orifice 115 thus permits immediate actuation of the valve plunger 96 upon such major change in the mean pressure value in the hydraulic line 25 but insensitive to minor changes.

The passage 101 of the valve 55 in FIGURE 12 is communicatively connected to the same source of air under pressure as that of passage 63 of the valve 54 previously described. The passage 101 communicatively connects with the conduit 116 leading through the casing 16 which in turn communicatively connects with air passage 117 disposed in the manifold block 81 as shown in FIGURE 3. The air passage 117 merges with previously described air passage 80 into conduit 84 which, as stated previously, leads to a source of air under pressure as is evident from FIGURES 3, 4 and 13. It will be noted that the air passage 117 and conduit 116 are larger than the corresponding air passage 80 and conduit 79 supplying compressed air to the primary compensator valve 54. This permits a much increased air flow rate to the valve 55 in the event that a sudden major change occurs in the mean pressure value of the hydraulic line 25.

Referring back to FIGURE 12 the regulated pressure discharge air passage 98 is communicatively connected to conduit 118 as shown in FIGURE 3 which in turn connects with air passage 88. As previously described the air passage 88 communicates with pneumatic compression chambers 43 and 43'.

FIGURE 13 depicts, in schematic form, one example of a hydraulic system to which the accumulator 15 of the present invention above described is adapted to be utilized. The free piston engine hydraulic pump 78 delivers hydraulic fluid under pressure in a hydraulic line to a hydraulic motor thus energizing the motor. The low pressure discharge side of the hydraulic motor is conducted back to the free piston engine hydraulic pump 78 and a conventional low pressure accumulator 119. The hydraulic line 25 leading to the accumulator 15 is communicatively connected to the working circuit high pressure hydraulic fluid line of the hydraulic system shown. Since the free piston engine hydraulic pump 78 is a piston type pump the fluid discharge therefrom will pulsate cyclically at a frequency depending upon the cyclic speed of the free piston engine 78. From this it will be apparent that the fluid in the hydraulic line 25 will pulsate, that is to say, the fluid pressure rises above the mean pressure value and falls bleow sum mean pressure value cyclically at a rapid rate. The accumulator 15 of this invention is effective to dampen such pulsations and automatically adjust itself responsive to changes in the mean pressure (working pressure) value. In fact a prototype constructed substantially in accordance with the drawing hereof satisfactorily functioned for a hydraulic line (e.g. hydraulic line 25) pulsating at 3000 cycles per minute at a mean pressure value of 4500 p.s.i. The operation of the accumulator 15 will now be described.

It will first be assumed that the accumulator 15 is operating wherein the mean pressure value of the pulsating fluid in hydraulic line 25 is substantially a constant. In such case the air pressure in the pneumatic compression chambers 43, 43' (and auxiliary tank 49 if employed) will be just sufficient in force to react upon air pistons 36, 36' to balance the opposing force of the mean pressure of the pulsating fluid in the chamber 24 acting on the inner ends of hydraulic pistons 35 and 35'. Thus the springs 40, 40', 42 and 42' are able to urge effectively the compound pistons 34, 34' to the approximate positions shown in FIGURE 2.

During a single cycle of pulsation of the fluid in chamber 24 the rise in pressure moves the compound pistons 34, 34' outwardly against the opposing air pressure in the pneumatic compression chambers 43, 43' and springs 40, 40'. Particularly where the auxiliary tank 49 is employed, the pressure rise in chambers 43, 43' due to outward movement of the compound pistons 34, 34' is insignificant. Subsequently when the pressure falls during the cycle of pulsation the compound pistons move inwardly due to the air pressure in pneumatic chambers 43, 43'. Thus it will be apparent that the compound pistons will stroke in resonance with the frequency of pulsations of the hydraulic fluid in line 25. It will also be apparent that the length of stroke of the compound pistons 34, 34' is dependent upon the mass of each of the compound pistons 34, 34' and the magnitude of pressure variation occurring in each cycle of pulsation. For this reason it is desirable that the mass of each of the compound pistons 34, 34' be as low as possible. Thus the lower the weight of each of the compound pistons 34, 34' correspondingly increases the effectiveness of the accumulator 15 in damping pulsations particularly where the pulsations are at the higher frequencies, e.g. 3000 cycles per minute. The automatic adjustment of air pressure in the pneumatic compression chambers 43, 43' responsive to a change in the mean pressure value of the hydraulic fluid in line 25 will now be described.

Assuming that a minor increase occurs in the mean pressure value in the hydraulic line 25 such increase is reflected in the conduit 74 leading to the primary compensator valve 54. Since an increase in the mean pressure value of the hydraulic line 25 increases the force on the hydraulic pistons 35, 35' of the compound pistons 34, 34' a corresponding increase in air pressure is required in the pneumatic compression chambers 43, 43' to balance. Referring to FIGURE 10 the increase in the mean pressure value in the hydraulic line 25 correspondingly increases the pressure in conduit 74 leading to the primary compensator valve 54 which increases the force on piston 72 thus moving the valve plunger 58 leftwardly against the spring 70 and air pressure in the air chamber 66. It will be remembered that the pressure of the air in the air chamber 66 is equal to the air pressure in the pneumatic compression chambers 43 and 43'.

Leftward movement of the valve plunger 58 in the primary compensator valve 54 registers circumferential groove 65 with annular groove 59 thus communicating the source of air under pressure in passage 63 with the regulated pressure discharge air passage 60 which in turn communicates with the pneumatic compression chambers 43 and 43' as previously explained. The air pressure in the pneumatic compression chambers 43, 43' accordingly rises until the pressure in the air chamber 66 (FIGURE 10) is sufficiently high to move the valve plunger 58 back to the position illustrated in FIGURE 10. The accumulator 15 is then operating at the increased value of the mean pressure in the hydraulic line 25. Since the pressure increase in the hydraulic line 25 was minor the secondary compensator valve 55 would not operate because such minor pressure change is insufficient to upset the balance of the heavy compression springs 108 and 109. It will thus be apparent that the characteristics of springs 40, 40', 42 and 42' should be chosen with care so that the primary compensator valve 54 will actuate before the compound pistons 34, 34' reach a limit of their respective stroke.

In the event that a minor decrease in the mean pressure value occurs in the hydraulic line 25 the primary compensator valve 54 operates reversedly from that just described. The hydraulic pressure drop in the conduit 74 allows the air pressure in the air chamber 66 to move the valve plunger 58 rightwardly thereby registering the peripheral groove 64 with the annular groove 59 and vent port 61. Thus air under pressure in the pneumatic compression chambers 43, 43' bleeds out through the vent port 61 until the air pressure in air chamber 66 is reduced sufficiently to permit the hydraulic piston 72 to move the valve plunger 58 leftwardly to the position illustrated in FIGURE 10. The accumulator 15 is thus adjusted to operate on the lower value of the mean pressure in the hydraulic line 25.

The secondary compensator valve 55 operates in the same manner as that of the primary compensator valve 54 except that due to the relatively strong characteristics of the balancing springs 108 and 109 it requires a major abrupt increase (or decrease) in the mean pressure value in the hydraulic line 25. When such major abrupt increase (or decrease) in hydraulic pressure occurs the valve plunger 96 of the secondary compensator valve 55 functions along with the valve plunger 58 of the primary compensator valve 54. Thus both valves 54 and 55 combinedly function to effect a rapid correction of the air pressure in the pneumatic compression chambers 43, 43' to meet the altered mean pressure level in the hydraulic line 25. This permits the accumulator 15 to continue functioning in damping pulsations in the hydraulic line 25 even during a sudden major change in the mean pressure value in the hydraulic line 25.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A fluid pressure accumulator for damping pressure pulsations in a hydraulic pressure line having a variable means pressure value comprising a casing, an elastic fluid piston connected to a hydraulic piston forming a compound piston axially slidable in said casing, an elastic fluid compression chamber positioned to urge resiliently said compound piston in one direction, a hydraulic chamber connected to said hydraulic pressure line and positioned to urge said compound piston in the other direction whereby said compound piston oscillates substantially in resonance with said pulsations thereby damping said pulsations, a primary compensator valve connected to said hydraulic pressure line and to a source of elastic fluid under pressure for adjustably compensating the pressure of elastic fluid in said elastic fluid compression chamber proportionately to variations in the mean pressure value of said hydraulic pressure line, and a secondary compensator valve connected to a source of elastic fluid under pressure for adjustably compensating rapidly the pressure of elastic fluid in said elastic compression chamber proportionately to abrupt major variations in the mean pressure value of said hydraulic pressure line for preventing said compound piston from reaching its maximum stroke limits.

2. A fluid pressure accumulator according to claim 1 wherein the communication connection of at least one of said compensator valves to said hydraulic pressure line includes a fluid flow restriction for damping pressure pulsations to said actuating means in said valves.

3. A fluid pressure accumulator for damping pressure pulsations in a hydraulic pressure line having a variable mean pressure value comprising a casing, an elastic fluid piston connected to a hydraulic piston forming a compound piston axially slidable in said casing, opposing spring means disposed in said casing adapted to urge said compound piston axially toward a predetermined position, an elastic fluid compression chamber positioned to urge resiliently said compound piston in one direction, a hydraulic chamber connected to said hydraulic pressure line and positioned to urge said compound piston in the other direction whereby said compound piston oscillates substantially in resonance with said pulsations thereby damping said pulsations, a primary compensator valve connected to said hydraulic pressure line and to a source of elastic fluid under pressure for adjustably compensating the pressure of elastic fluid in said elastic fluid compression chamber proportionately to variations in the mean pressure value of said hydraulic pressure line, and a secondary compensator valve connected to said hydraulic pressure line and to said source of elastic fluid under pressure for adjustably compensating rapidly the pressure of elastic fluid in said elastic fluid compression chamber proportionately to abrupt major variations in the mean pressure value of said hydraulic pressure line for preventing said compound piston from reaching its maximum stroke limits.

4. A fluid pressure accumulator according to claim 3 wherein the communication connection of at least one of said compensator valves to said hydraulic pressure line includes a fluid flow restriction for damping pressure pulsations to actuating means in said valves.

5. A fluid pressure accumulator for damping pressure pulsations in a hydraulic pressure line having a variable mean pressure value comprising a casing, an elastic fluid piston connected to a hydraulic piston forming a compound piston axially slidable in said casing, an elastic fluid compression chamber positioned to urge resiliently said compound piston in one direction, a hydraulic chamber connected to said hydraulic pressure line and positioned to urge said compound piston in the other direction whereby said compound piston oscillates substantially in resonance with said pulsations thereby damping said pulsations, a primary compensator valve connected to a source of elastic fluid under pressure and said hydraulic pressure line, said compensator valve including a first valve plunger having first actuating means for actuation to move said first valve plunger in one direction to connect communicatively said source with said compression chamber to elevate compensatingly the pressure in said compression chamber responsive to a rise in the mean pressure value in said hydraulic pressure line and alternately actuate to move said valve plunger in the other direction to connect communicatively said compression chamber with the atmosphere to lower compensatingly the pressure in said compression chamber responsive to a fall in the mean pressure value in said hydraulic pressure line, and a secondary compensator valve connected to said source of elastic fluid under pressure and said hydraulic pressure line, said secondary compensator valve including a second valve plunger having a second actuating means for actuation to move said second valve plunger in one direction to communicate said source with said compression chamber to rapidly elevate compensatingly the pressure in said compression chamber responsive to an abrupt major rise in the mean pressure value in said hydraulic pressure line and alternately actuate to move said second valve plunger in the other direction to connect communicatively said compression chamber with the atmosphere to lower compensatingly the pressure in said compression chamber responsive to an abrupt major fall in the mean pressure value in said hydraulic pressure line for preventing said compound piston from reaching its maximum stroke limits.

6. A fluid pressure accumulator according to claim 5 wherein the communication connection of at least one of said compensator valves to said hydraulic pressure line includes a fluid flow restriction for damping pressure pulsations to said actuating means in said valves.

7. A fluid pressure accumulator for damping pressure pulsations in a hydraulic pressure line having a variable mean pressure value comprising a casing, an elastic fluid piston connected to a hydraulic piston forming a compound piston axially slidable in said casing, opposing spring means disposed in said casing adapted to urge said compound piston axially toward a predetermined position, an elastic fluid compression chamber positioned to urge resiliently said compound piston in one direction, a hydraulic chamber connected to said hydraulic pressure line and positioned to urge said compound piston in the other direction whereby said compound piston oscillates substantially in resonance with said pulsations thereby damping said pulsations, a primary compensator valve connected to a source of elastic fluid under pressure and said hydraulic pressure line, said compensator including a first valve plunger having a first actuating means for actuation to move said first valve plunger in one direction to connect communicatively said source with said compression chamber to elevate compensatingly the pressure in said compression chamber responsive to a rise in the means pressure value in said hydraulic pressure line and alternately actuate to move said first valve plunger in the other direction to connect communicatively said compression chamber with the atmosphere to lower compensatingly the pressure in said compression chamber responsive to a fall in the mean pressure value in having a said hydraulic pressure line, and a secondary compensator valve connected to said source of elastic fluid under pressure and said hydraulic pressure line, said secondary compensator valve including a second valve plunger second actuating means for actuation to move said second valve plunger in one direction to communicate said source with said compression chamber to rapidly elevate compensatingly the pressure in said compression chamber responsive to an abrupt major rise in the mean pressure value in said hydraulic pressure line and alternately actuate to move said second valve plunger in the other direction to connect communicatively said compression chamber with the atmosphere to lower compensatingly the pressure in said compression chamber responsive to an abrupt major fall in the mean pressure value in said hydraulic pressure line for preventing said compound piston from reaching its maximum stroke limits.

8. A fluid pressure accumulator according to claim 7 wherein the communication connection of at least one of said compensator valves to said hydraulic pressure line includes a fluid flow restriction for damping pressure pulsations to said actuating means in said valves.

9. A fluid pressure accumulator for damping pressure pulsations in a hydraulic pressure line having a variable mean pressure value comprising in combination a casing, a first elastic fluid piston connected to a first hydraulic piston forming a first compound piston axially slidable in said casing, opposing first spring means disposed in said casing adapted to urge said first compound piston axially toward a predetermined first position, a second elastic fluid piston connected to a second hydraulic piston forming a second compound piston axially slidable in said casing, opposing second spring means disposed in said casing adapted to urge said second compound piston axially toward a predetermined second position, said first compound piston being in axial alignment with respect to said second compound piston, a first elastic fluid compression chamber positioned outboardly to urge resiliently said first compound piston inwardly toward said second compound piston, a second elastic fluid compression chamber positioned outboardly to urge resiliently said second compound piston inwardly toward said first compound piston, and a hydraulic chamber communicatively connected to said hydraulic pressure line and positioned inboardly to urge each of said compound pistons outwardly whereby said compound pistons oscillate in opposed relation substantially in resonance with said pulsations thereby damping said pulsations and minimizing vibrations of said casing.

10. A fluid pressure accumulator for damping pressure pulsations in a hydraulic pressure line having a variable mean pressure value comprising in combination a casing, a first elastic fluid piston connected to a first hydraulic piston forming a first compound piston axially slidable in said casing, opposing first spring means disposed in said casing adapted to urge said first compound piston axially toward a predetermined first position, a second elastic fluid piston connected to a second hydraulic piston forming a second compound piston axially slidable in said casing, opposing second spring means disposed in said casing adapted to urge said second compound piston axially toward a predetermined second position, said first compound piston being in axial alignment with respect to said second compound piston, a first elastic fluid compression chamber positioned outboardly to urge resiliently said first compound piston inwardly toward said second compound piston, a second elastic fluid compression chamber positioned outboardly to urge resiliently said second compound piston inwardly toward said first compound piston, a hydraulic chamber communicatively connected to said hydraulic pressure line and positioned inboardly to urge each of said compound pistons outwardly whereby said compound pistons oscillate in opposed relation substantially in resonance with said pulsations thereby damping said pulsations and minimizing vibrations of said casing, a primary compensator valve connected to said hydraulic pressure line and to a source of elastic fluid under pressure for adjustably compensating the pressure of elastic fluid in said elastic fluid compression chambers proportionately in response to variations in the mean pressure value in said hydraulic pressure line, and a secondary compensator valve connected to said hydraulic pressure line and to said source of elastic fluid under pressure for adjustably compensating rapidly the pressure of elastic fluid in said first and second elastic fluid compression chambers proportionately in response to abrupt major variations in the mean pressure value in said hydraulic pressure line for preventing said compound pistons from reaching their respective maximum stroke limits.

11. A fluid pressure accumulator according to claim 10 wherein the communication connection of at least one of said compensator valves includes a fluid flow restriction for damping pressure pulsations to actuating means in said valves.

12. A fluid pressure accumulator for damping pressure pulsations in a hydraulic pressure line having a variable mean pressure value comprising a casing, an elastic fluid piston connected to a hydraulic piston forming a compound piston axially slidable in said casing, an elastic fluid compression chamber positioned to urge resiliently said compound piston axially in one direction, a hydraulic chamber connected to said hydraulic pressure line and positioned to urge said compound piston axially in the other direction whereby said compound piston oscillates substantially in resonance with said pulsations thereby damping said pulsations, a spool valve connected to a source of elastic fluid under pressure and said hydraulic pressure line, said spool valve having actuating means for actuation in one direction for communicatively connecting said source with said compression chamber to elevate compensatingly the pressure in said compression chamber responsive to a rise in the mean pressure value in said hydraulic pressure line and alternately actuated in the other direction for communicatively connecting said compression chamber with the atmosphere to lower compensatingly the pressure in said compression chamber responsive to a fall in the mean pressure value in said hydraulic pressure line thereby preventing said compound piston from reaching its maximum stroke limits, and a fluid flow restriction interposed between said hydraulic pressure line and said spool valve for damping hydraulic pressure pulsations to the said actuating means.

13. A fluid pressure accumulator for damping pressure pulsations in a hydraulic pressure line having a variable mean pressure value comprising a casing, an elastic fluid piston connected to a hydraulic piston forming a compound piston axially slidable in said casing, opposing spring means disposed in said casing adapted to urge said compound piston axially toward a predetermined position, an elastic fluid compression chamber positioned to urge resiliently said compound piston axially in one direction, a hydraulic chamber connected to said hydraulic pressure line and positioned to urge said compound piston axially in the other direction whereby said compound piston oscillates substantially in resonance with said pulsations thereby damping said pulsations, a spool valve connected to a source of elastic fluid under pressure and said hydraulic pressure line, said spool valve having actuating means for communicatively connecting said source with said compression chamber to elevate compensatingly the pressure in said compression chamber responsive to a rise in the mean pressure value in said hydraulic pressure line and alternately actuated in the other direction for communicatively connecting said compression chamber with the atmosphere to lower compensatingly the pressure in said compression chamber responsive to a fall in the mean pressure value in said hydraulic pressure line thereby preventing said compound piston from reaching its maximum stroke limits, and a fluid flow restriction interposed between said hydraulic pressure line and said spool valve for damping hydraulic pressure pulsations to the said actuating means.

References Cited

UNITED STATES PATENTS

| | | | |
|---|---|---|---|
| 273,044 | 2/1883 | Edson | 138—31 |
| 359,315 | 3/1887 | Cregier | 138—31 |
| 2,321,093 | 6/1943 | Lupter | 138—31 |
| 2,592,613 | 4/1952 | Snyder | 138—31 |
| 2,605,716 | 8/1952 | Huber | 138—31 X |
| 2,789,581 | 4/1957 | Kerr | 138—31 |

LAVERNE D. GEIGER, *Primary Examiner.*

C. L. HOUCK, *Examiner.*